(12) United States Patent
Petschke et al.

(10) Patent No.: US 12,240,424 B2
(45) Date of Patent: Mar. 4, 2025

(54) DISC BRAKE FOR A UTILITY VEHICLE, AND BRAKE PAD SET

(71) Applicant: KNORR-BREMSE Systeme fuer Nutzfahrzeuge GmbH, Munich (DE)

(72) Inventors: Andreas Petschke, Neuburg am Inn (DE); Michael Hidringer, Hofkirchen (DE); Martin Pleintinger, Eichendorf (DE); Josef Schropp, Eichendorf (DE); Tobias Fischl, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 831 days.

(21) Appl. No.: 16/771,774

(22) PCT Filed: Nov. 4, 2018

(86) PCT No.: PCT/EP2018/083446
§ 371 (c)(1),
(2) Date: Jun. 11, 2020

(87) PCT Pub. No.: WO2019/115286
PCT Pub. Date: Jun. 20, 2019

(65) Prior Publication Data
US 2021/0206355 A1    Jul. 8, 2021

(30) Foreign Application Priority Data
Dec. 12, 2017 (DE) .................. 10 2017 129 672.7

(51) Int. Cl.
*B60T 1/06* (2006.01)
*F16D 55/226* (2006.01)
(Continued)

(52) U.S. Cl.
CPC .......... *B60T 1/065* (2013.01); *F16D 55/2262* (2013.01); *F16D 65/0056* (2013.01);
(Continued)

(58) Field of Classification Search
CPC .... F16D 65/18; F16D 2127/02; F16D 55/226; F16D 65/0972; F16D 65/097;
(Continued)

(56) References Cited

U.S. PATENT DOCUMENTS 4,512,446 A * 4/1985 Chuwman ......... F16D 55/22655
188/264 G
5,125,482 A * 6/1992 Negishi .................. F16D 65/092
188/73.38
(Continued)

FOREIGN PATENT DOCUMENTS

| CN | 102032296 A | 4/2011 |
| CN | 103987984 A | 8/2014 |

(Continued)

OTHER PUBLICATIONS

DE 102016120481 A1 (Year: 2018).*
(Continued)

*Primary Examiner* — Bradley T King
*Assistant Examiner* — Mahbubur Rashid
(74) *Attorney, Agent, or Firm* — Crowell & Moring LLP

(57) ABSTRACT

A disc brake for a utility vehicle includes a brake caliper, designed as a sliding caliper and engaging over a brake disc, which is secured to a stationary brake carrier. Two brake pads, which are arranged in the brake caliper, can move inversely and have a respective pad carrier plate and a friction lining secured thereon, of which an action-side or application-side brake pad can be pressed against the brake disc by an application device via at least one brake piston. The brake pads are each accommodated in a pad housing of the stationary brake carrier, wherein the pad housing is formed by two opposing brake carrier horns and a longitudinal connector connecting the brake carrier horns. At least one of the brake pads is assigned a pad return device, with
(Continued)

which the at least one brake pad can be returned after a brake-dependent shifting and releasing of the brake.

14 Claims, 10 Drawing Sheets

(51) Int. Cl.
    *F16D 65/00*     (2006.01)
    *F16D 65/097*     (2006.01)
    *F16D 55/00*     (2006.01)
    *F16D 127/02*     (2012.01)

(52) U.S. Cl.
    CPC .. *F16D 65/0971* (2013.01); *F16D 2055/0008* (2013.01); *F16D 2127/02* (2013.01)

(58) Field of Classification Search
    CPC ............. F16D 65/0975; F16D 65/0977; F16D 65/0978; F16D 2065/1396; F16D 2065/1368; F16D 65/0976; F16D 2121/06; F16D 13/69; F16D 2065/1348; F16D 65/0974; F16D 2065/1364; F16D 55/2262; F16D 65/0056; F16D 65/0971; F16D 2055/0008; B60T 1/065
    See application file for complete search history.

(56) References Cited

U.S. PATENT DOCUMENTS

| | | | |
|---|---|---|---|
| 5,535,856 A * | 7/1996 | McCormick | F16D 55/227 188/205 A |
| 5,538,103 A | 7/1996 | Rueckert et al. | |
| 5,549,181 A * | 8/1996 | Evans | F16D 65/097 188/73.38 |
| 6,340,076 B1 | 1/2002 | Tsuchiya | |
| 7,219,773 B2 * | 5/2007 | Ono | F16D 65/0972 188/73.38 |
| 7,318,503 B2 * | 1/2008 | Farooq | F16D 65/0974 188/73.31 |
| 8,376,092 B2 * | 2/2013 | Lethorn | F16D 65/0977 188/73.38 |
| 8,439,171 B2 * | 5/2013 | Kaneko | F16D 65/0977 188/73.38 |
| 8,636,119 B2 * | 1/2014 | Bach | F16D 65/0979 188/73.38 |
| 8,869,950 B2 * | 10/2014 | Maehara | F16D 65/0976 188/73.38 |
| 9,016,442 B2 * | 4/2015 | Odaira | F16D 65/0006 188/73.38 |
| 9,670,977 B2 * | 6/2017 | Boyle | F16D 65/0972 |
| 10,563,713 B2 | 2/2020 | Fricke et al. | |
| 2006/0237269 A1 | 10/2006 | Farooq | |
| 2009/0159376 A1 * | 6/2009 | Rossignol | F16D 65/0978 188/73.38 |
| 2010/0000828 A1 | 1/2010 | Pericevic et al. | |
| 2011/0168503 A1 * | 7/2011 | Chelaidite | F16D 65/0978 188/73.31 |
| 2012/0186918 A1 | 7/2012 | Wakabayashi et al. | |
| 2012/0222925 A1 | 9/2012 | Kaneko | |
| 2014/0305753 A1 * | 10/2014 | Macy | F16D 65/0977 188/216 |
| 2014/0339026 A1 | 11/2014 | Gutelius et al. | |
| 2015/0008078 A1 | 1/2015 | Asen et al. | |
| 2015/0008080 A1 | 1/2015 | Baumgartner et al. | |
| 2015/0021127 A1 * | 1/2015 | Miura | F16D 65/0977 188/73.38 |
| 2015/0176666 A1 | 6/2015 | Bernard et al. | |
| 2016/0102722 A1 * | 4/2016 | Foucoin | F16D 55/2265 188/196 R |
| 2018/0065608 A1 | 3/2018 | Persson | |
| 2018/0106309 A1 | 4/2018 | Fricke et al. | |
| 2018/0345919 A1 | 12/2018 | Nishino et al. | |

FOREIGN PATENT DOCUMENTS

| | | |
|---|---|---|
| CN | 106460973 A | 2/2017 |
| CN | 107407358 A | 11/2017 |
| DE | 43 01 621 A1 | 8/1993 |
| DE | 196 23 867 A1 | 1/1998 |
| DE | 699 31 717 T | 5/2007 |
| DE | 10 2007 001 213 A1 | 7/2008 |
| DE | 10 2011 100 160 A1 | 11/2012 |
| DE | 10 2012 006 111 A1 | 9/2013 |
| DE | 10 2012 102 584 A | 9/2013 |
| DE | 10 2016 117 777 A | 3/2018 |
| DE | 10 2016 120 481 A | 5/2018 |
| EP | 2 213 900 A1 | 8/2010 |
| EP | 2 792 899 A1 | 10/2014 |
| EP | 3 051 163 A1 | 8/2016 |
| EP | 2 792 899 B1 | 5/2020 |
| JP | 8-54036 A | 2/1996 |
| JP | 2002-250382 A | 9/2002 |
| JP | 2010-281370 A | 12/2010 |
| WO | WO 2006/136740 A1 | 12/2006 |
| WO | WO 2016/202778 A1 | 12/2016 |
| WO | WO 2017/090643 A1 | 6/2017 |
| WO | WO 2018/054825 A1 | 3/2018 |
| WO | WO 2018/077728 A1 | 5/2018 |

OTHER PUBLICATIONS

EP 0597893 B2 (Year: 1999).*
WO 2018003197 A1 (Year: 2018).*
DE 4208003 A1 (Year: 1992).*
DE 102015007523 A1 (Year: 2016).*
EP 2975286 B1 (Year: 2018).*
KR 100687013 B1 (Year: 2007).*
DE 102014113617 A1 (Year: 2016).*
International Preliminary Report on Patentability (PCT/IB/326 & PCT/IB/373) issued in PCT Application No. PCT/EP2018/083446 dated Jun. 25, 2020, including English translation of document C2 (German-language Written Opinion (PCT/ISA/237) previously filed on Jun. 11, 2020 (nine pages).
German-language Office Action issued in German Application No. 10 2017 129 672.7 dated Nov. 30, 2018 (nine (9) pages).
Chinese-language Office Action issued in Chinese Application No. 201880080462.5 dated Apr. 2, 2021 with partial English translation (16 pages).
International Search Report (PCT/ISA/210) issued in PCT Application No. PCT/EP2018/083446 dated Feb. 20, 2019 with English translation (five (5) pages).
German-language Written Opinion (PCT/ISA/237) issued in PCT Application No. PCT/EP2018/083446 dated Feb. 20, 2019 (five (5) pages).

* cited by examiner

DISC BRAKE FOR A UTILITY VEHICLE, AND BRAKE PAD SET

BACKGROUND AND SUMMARY OF THE INVENTION

The invention relates to a disc brake for a utility vehicle. The invention also relates to a brake pad set.

In the case of a generic disc brake also known as a sliding caliper brake (or also floating caliper brake), when braking by means of an application apparatus which can be actuated pneumatically or by electric motor, an application-side brake pad is pressed against a vehicle-side brake disc. In the further course of the braking process, the brake caliper is displaced, relative to the disc brake, counter to the application direction of the application-side brake pad while carrying along and pressing the opposite, reaction-side (rear-side) brake pad onto the other side of the brake disc.

After a release of the brake, in the case of the known disc brake, the brake caliper remains in this position in which the brake pads, at least, however, the reaction-side brake disc bears against the brake disc without pressure, but in a grinding manner. The residual grinding moments of the brake pads which occur as a result during driving operation have in this regard a disadvantageous effect since they lead to increased fuel consumption and to a reduction in the service life of the components involved, namely the brake disc and the brake pads.

A slight detachment of the brake pads does indeed occur during driving operation, for example, as a result of a lateral run-out of the brake disc and as a result of shocks and transverse acceleration during cornering. These effects are, however, not sufficient in order to effectively prevent the stated residual grinding moments. These effects can also once again lead to the brake pads bearing against the brake disc after a release of the brake pads from the brake disc, as a result of which in turn a residual grinding moment can be generated.

DE 10 2007 001 213 describes a disc brake with a pad resetting apparatus which is arranged in one of the guide rails via which the brake caliper is held displaceably on the brake carrier and which has a resilient resetting element by which the brake caliper is displaced into a starting position.

This constriction is tried and tested in principle. However, the use of this known pad resetting apparatus in the case of compressed air-activated disc brakes of heavy utility vehicles can lead to problems since wide limits of variable influences as a result of component tolerances and component deformation are active here which do not allow a secure functioning of this pad resetting apparatus in all cases.

Comparable problems arise in the case of a disc brake as is discussed in DE 10 2012 006 111 A1. Here, a pad resetting apparatus is arranged on the side opposite the application apparatus and facing the reaction-side brake pad, as a result of which an active, in particular automatic resetting of the brake caliper is achieved, with at the same time absolute minimal effect on system rigidity.

In any event, the pad resetting apparatus acts on the brake caliper, wherein the brake carrier acts as a counter-bearing.

DE 43 01 621 A1 describes a floating caliper disc brake with a stationary brake carrier which has two carrier arms which project over the outer edge of a disc brake, with brake shoes arranged on both sides of the brake disc and having in each case a friction lining and a rear plate, which brake blocks are supported displaceably on the carrier arms, with a floating caliper which is guided axially displaceably on the brake carrier and which engages around the brake shoes and has a specific actuating device for pushing the brake shoes onto the brake disc, with a spring arrangement which acts on the brake shoes axially in the brake release direction and which, after braking, supports the adjustment of play between brake shoes and brake disc. The spring arrangement has at least one expander spring which is fastened overall non-displaceably on a carrier arm of the brake carrier in the axial direction such that the fastening is performed on a portion of the carrier arm located above the outer edge of the brake disc and that the expander spring has at least two spring arms which resiliently bear in the axial direction against the rear plates of the brake shoes.

US2014/0339026 A1 describes an expander spring, comprising a locking arm which connects the expander spring to a brake component, a pull-back arm; and a pretensioning apparatus which is arranged between the locking arm and the return arm, wherein the pretensioning device comprises six spiral-shaped loops or more which store energy during a brake activation and, as soon as the braking process is concluded, pull the brake components (brake pad) back. A brake caliper in the form of a first caliper, which is not a sliding caliper, is indicated. This is suitable for a car, but not for a utility vehicle.

The object on which the invention is based is to further develop a disc brake of the generic type so that, with structurally very simple means, the service life in particular of the brake pads and the brake disc are increased and the operating costs overall are reduced, wherein changing of the brake pads is facilitated.

A further object lies in providing a corresponding brake pad set.

A disc brake according to the invention for a utility vehicle comprises a brake caliper which engages over a brake disc, is formed as a sliding caliper and is fastened to a stationary brake carrier, two brake pads which are arranged in the brake caliper, can be moved in opposite directions and have in each case a pad carrier plate and a friction lining fastened thereto, of which brake pads one action-side or application-side brake pad can be pressed by means of an application apparatus via at least one brake piston against the brake disc, wherein the brake pads are received in each case in a pad channel of the stationary brake carrier, wherein the pad channel is fixed by two opposing brake carrier horns and a longitudinal connector which connects the brake carrier horns, as well as at least one resetting apparatus with which the brake pads are capable of being returned after a braking-induced displacement and release of the brake. A pad resetting apparatus is assigned to at least one of the brake pads, with which pad resetting apparatus the at least one brake pad can be returned after a braking-induced displacement and release of the brake.

By means of the assignment of a respective resetting apparatus to each of the two brake pads, it is possible that resetting elements of the resetting apparatus are separated to the respective brake pad. As a result of this separation, it has been shown to be advantageous that no elements for resetting the brake pads are required in the region of the brake disc overlap. A change of the brake pads is thus facilitated since no resetting elements or devices in the brake disc overlap have to be removed and installed again.

A further advantage arises in that, as a result of the return of the brake pads from the brake disc by means of the respective pad resetting apparatus, residual grinding of the respective brake pad on the brake disc can be ruled out or at least significantly reduced. A service life of the friction partners brake pads/brake disc can thus be increased and fuel consumption can be reduced.

Corresponding brake pad sets for the disc brake described above, having at least two brake pads, are provided with in each case one pad carrier plate and a friction lining fitted on the pad carrier plate. The brake pad set has at least one pad resetting apparatus with at least one resetting element for an associated brake pad. In one embodiment, the conventional brake pads can advantageously be used without changing, wherein only the resetting elements can be supplemented in the event of a change or refitting.

In one embodiment of the disc brake, the pad resetting apparatus of the associated one brake pad has two resetting elements of which in each case one resetting element is fastened to in each case one of opposing brake carrier horns of a pad channel of the stationary brake carrier. A change in the brake pads is advantageously not necessary. A further advantage lies in the fact that the resetting elements can be easily placed onto the brake carrier horns.

A particular advantage lies in the fact that simple retrofitting is made possible since no machining or changes to the existing disc brake are necessary.

It is advantageous that the resetting elements have in each case a spring arm and holding portions, wherein the respective spring arm is fitted on one of the holding portions. This produces a compact component. Moreover, only one embodiment is required since the resetting element can be placed in a reversed manner onto the opposite brake carrier horn.

It is furthermore provided that the resetting elements are pushed-on and fastened with their respective holding portions on the respective brake carrier horn of the pad channel, wherein the spring arms project in each case into the pad channel. This results in simple and rapid mounting.

For advantageous simplified attachment, the respective holding portions of the resetting elements can form a type of clamp and be fitted on the respective brake carrier horn of the pad channel by jamming.

In a further configuration, it is provided that the spring arms of the resetting elements are in contact with a pad carrier plate of the associated brake pad which is arranged in the pad channel between the brake carrier horns in such a manner that the respective spring arm is in contact in a central region of an edge of a side surface of the pad carrier plate with the pad carrier plate as a result of action of a spring force of the spring arm. This enables simple mounting of the brake pads.

In one alternative embodiment, the pad resetting apparatus of the one associated brake pad has at least one resetting element which is fastened to a longitudinal connector of a pad channel of the stationary brake carrier. In this case, the advantage arises of a minimal number of components since only one resetting element has to be mounted.

It is furthermore provided that the resetting element comprises a pressure portion, a spring portion and holding portions, wherein the pressure portion has a winding which is fitted via the spring portion on an end of a first holding portion. This results in a compact component.

A further embodiment provides that the resetting element is fitted with its holding portions in a clamp-like manner around the longitudinal connector of the brake carrier and is fixed on the longitudinal connector by clamping action of the holding portions. Simple installation is thus possible.

In yet another embodiment, the pressure portion and the spring portion are arranged on the top side of the longitudinal connector and in a recess of the friction lining of the associated one brake pad, wherein the pressure portion is in contact with a contact surface of a pad side of the pad carrier plate of the associated one brake pad by action of a spring force of the spring portion. The recess enables advantageously simple installation of the brake pad.

In a further alternative embodiment, the pad resetting apparatus of the associated one brake pad has at least two resetting elements which are fastened both to the associated one brake pad and in a stationary manner to the respectively associated brake carrier horns. In this case, there is an advantage that the resetting elements are already fastened securely to the respective brake pad.

One embodiment provides that the resetting element has a spring portion at the end of which in each case a fastening portion is fitted. This results in a compact structure.

It is advantageous if the spring portion comprises a spring steel folded in a meandering manner, wherein folds lie in planes which run at a right angle to planes of the fastening portions. In this manner, functionality is ensured over a longer spring path.

In a further configuration, the resetting element is fastened with one end via one fastening portion to the pad rear plate of the associated one brake pad on its rear side and with the other end via the other fastening portion in a stationary manner to the brake carrier horn of the associated pad channel of the brake carrier.

In yet another alternative embodiment, the pad resetting apparatus of the associated one brake pad has at least one resetting element which is fastened to the pad carrier plate of the associated one brake pad. Advantageous securing of the resetting element against loss is thus achieved.

In one embodiment, the resetting element comprises a cylinder pin, a supporting arm and an energy accumulator element, wherein the resetting element is arranged installed in a lower region of the brake pad. This results in an advantageous saving of space.

In a further configuration, the cylinder pin of the resetting element has at one end a head, the diameter of which is larger than the diameter of the cylinder pin, and at the other end is connected to the supporting arm, wherein the force storage element is pushed-on on the cylinder pin and is arranged circumferentially around the cylinder pin between its head and the supporting arm. An advantageous compact structure is thus enabled.

It is furthermore provided in one embodiment that the resetting element is arranged installed in a lower region of the brake pad in such a manner that a portion of the cylinder pin with the head and the energy accumulator element are arranged in a recess of the friction lining and in a recess communicating therewith of the pad carrier plate, wherein the energy accumulator element is supported with one end thereof on the head of the cylinder pin and with the other end thereof on a wall portion of the pad carrier plate, wherein the cylinder pin extends guided displaceably through a through-hole of the wall portion and with the other end thereof on which the supporting arm is fitted projects from a rear side of the pad carrier plate. A space-saving installation is produced.

For support and stationary fitting, it is advantageous if the supporting arm has a body, a connecting end and an end portion, wherein the body is fixedly connected with the connecting end to the other end of the cylinder pin, and wherein the body extends over the longitudinal connector of the brake carrier and is adapted in its form to the outer contour of the longitudinal connector of the brake carrier, wherein a free end of the body is bent as the end portion around a lower edge of the longitudinal connector of the brake carrier, as a result of which the supporting arm thus forms a stationary support of the resetting element.

A yet further alternative embodiment provides that the pad resetting apparatus of the associated one brake pad has at least one resetting element which is fastened to the rear side of the pad carrier plate of the associated one brake pad. This produces a compact structure and a simple installation possibility.

It is advantageous if the resetting element is formed as an elongate leaf spring element composed of spring steel and is fastened centrally in the lower region of the pad carrier plate via a fastening element at the rear side. A space-saving structure and a flat configuration are thus possible.

In a further embodiment, the resetting element has a central fastening portion with which it is fastened via the fastening element to the rear side of the pad carrier plate of the associated one brake pad, and wherein three spring portions are respectively fitted at each end of the central fastening portion. This is advantageous because a simple structure is produced.

It is furthermore provided that the resetting element runs symmetrically to an axis of symmetry running radially to a brake disc rotational axis, which symmetrical axis runs centrally through the fastening element, extends tangentially to the brake disc beyond a respective side edge of the pad carrier plate up to beyond the respective associated brake carrier horn. A simple stationary support is thus possible.

For this purpose, it is advantageously provided that the respective third spring portions of the resetting element which extend beyond the respective associated brake carrier horn bear against the respectively associated brake carrier horn on its outer contour and form a stationary support of the resetting element.

In a further configuration of corresponding brake pad sets, these have in each case the at least one pad resetting apparatus described above with one or two resetting elements for an associated brake pad.

Further advantageous formations of the invention are characterized in the subordinate claims.

Exemplary embodiments of the invention are described below on the basis of the attached drawings.

BRIEF DESCRIPTION OF THE DRAWINGS

FIGS. 4-5 show schematic perspective partial views of a first variant of the pad resetting apparatus of the disc brake according to FIG. 1 with;

DETAILED DESCRIPTION OF THE DRAWINGS

Figure 1:
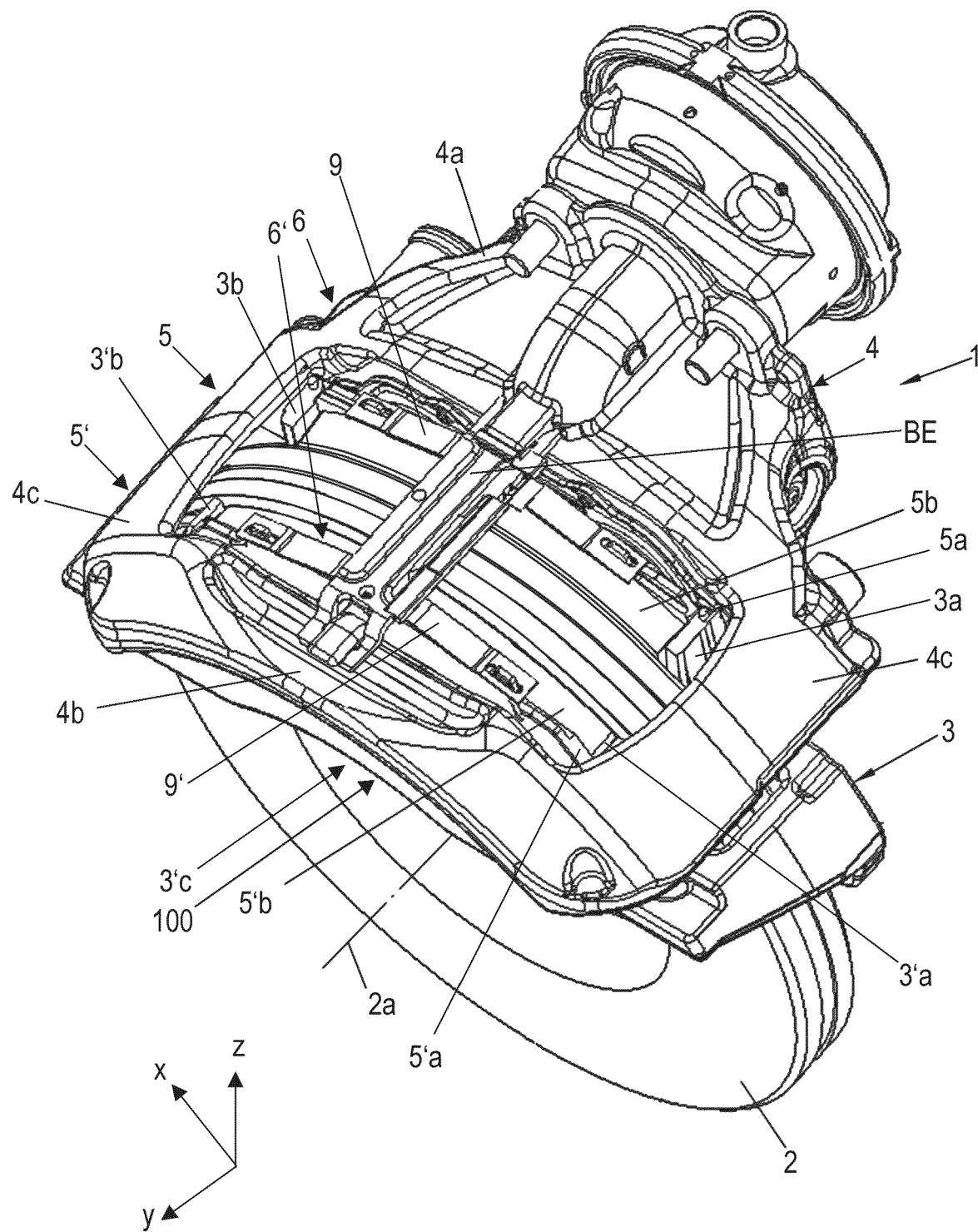
FIG. 1 shows a schematic perspective view of an exemplary embodiment of a disc brake according to the invention with a pad resetting apparatus.

Coordinates x, y, z serve the purpose of orientation. The x-coordinate runs in a direction of travel of a vehicle to which disc brake 1 is assigned. The y-coordinate runs in the direction of a disc brake axis 2a, and the z-coordinate runs perpendicular to an x-y plane.

The terms "top", "bottom", "left", "right" relate to the respective arrangements in the figures.

An "upper side" and a "lower side" of a brake pad 5, 5' or a pad carrier plate 4 always relate to the installation situation of respective brake pad 5, 5'. In this case, the lower side of respective brake pad 5, 5' lies in the radial direction closer to a brake disc rotational axis 2a of a disc brake 2 than the upper side of said brake pad 5, 5'.

The term "transverse axis" of brake pad 5, 5' refers to an imaginary axis which, in the installed state of brake pad 5, 5', runs in the z-direction radially to disc brake rotational axis 2a. A "longitudinal axis" of brake pad 5, 5' thus runs at a right angle to the transverse axis and tangentially to brake disc 2 in the x-direction.

Figure 2:
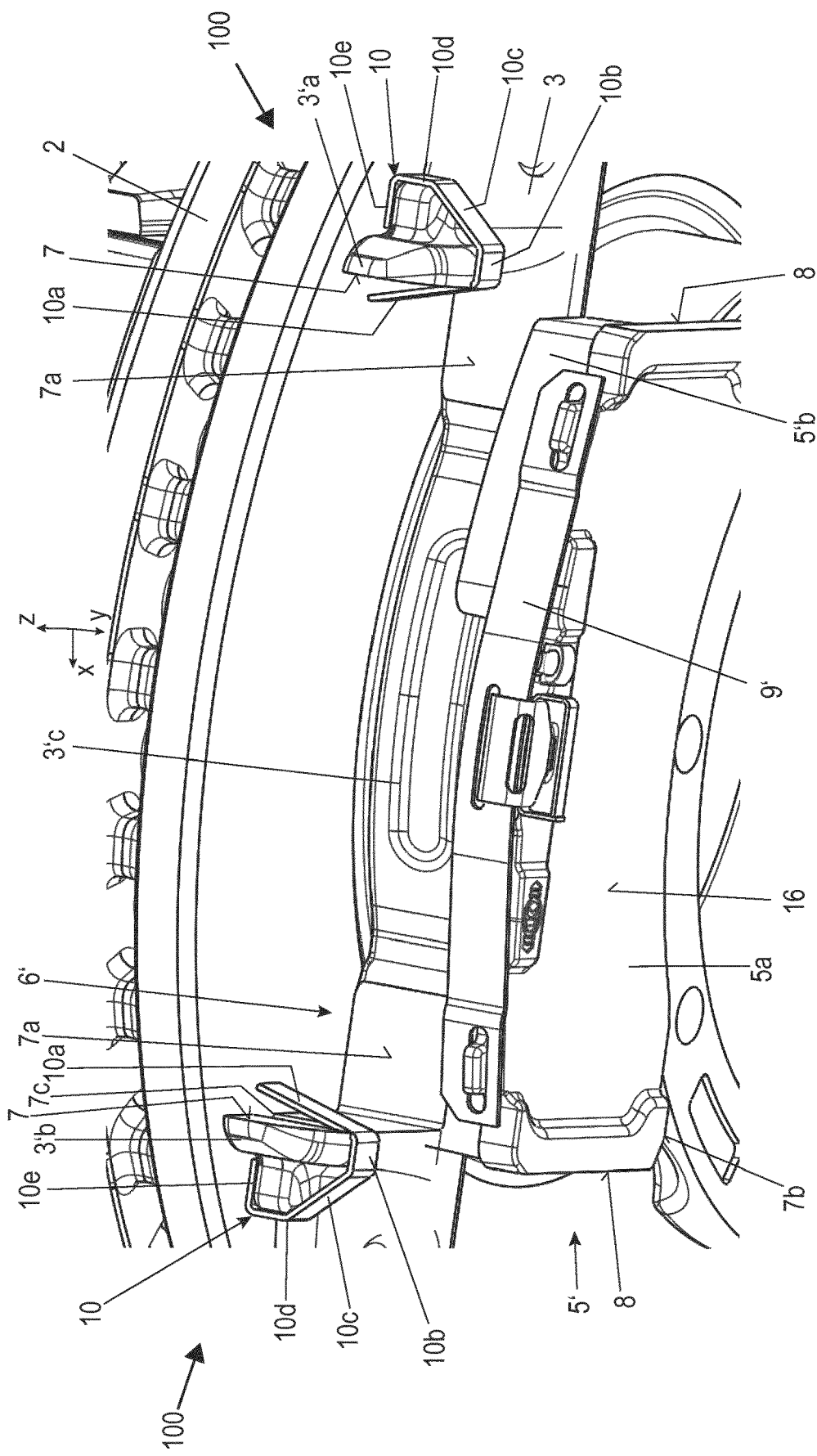
FIGS. 2-3 show schematic perspective views of a brake carrier of the disc brake according to FIG. 1 with the pad resetting apparatus.
Figure 3:
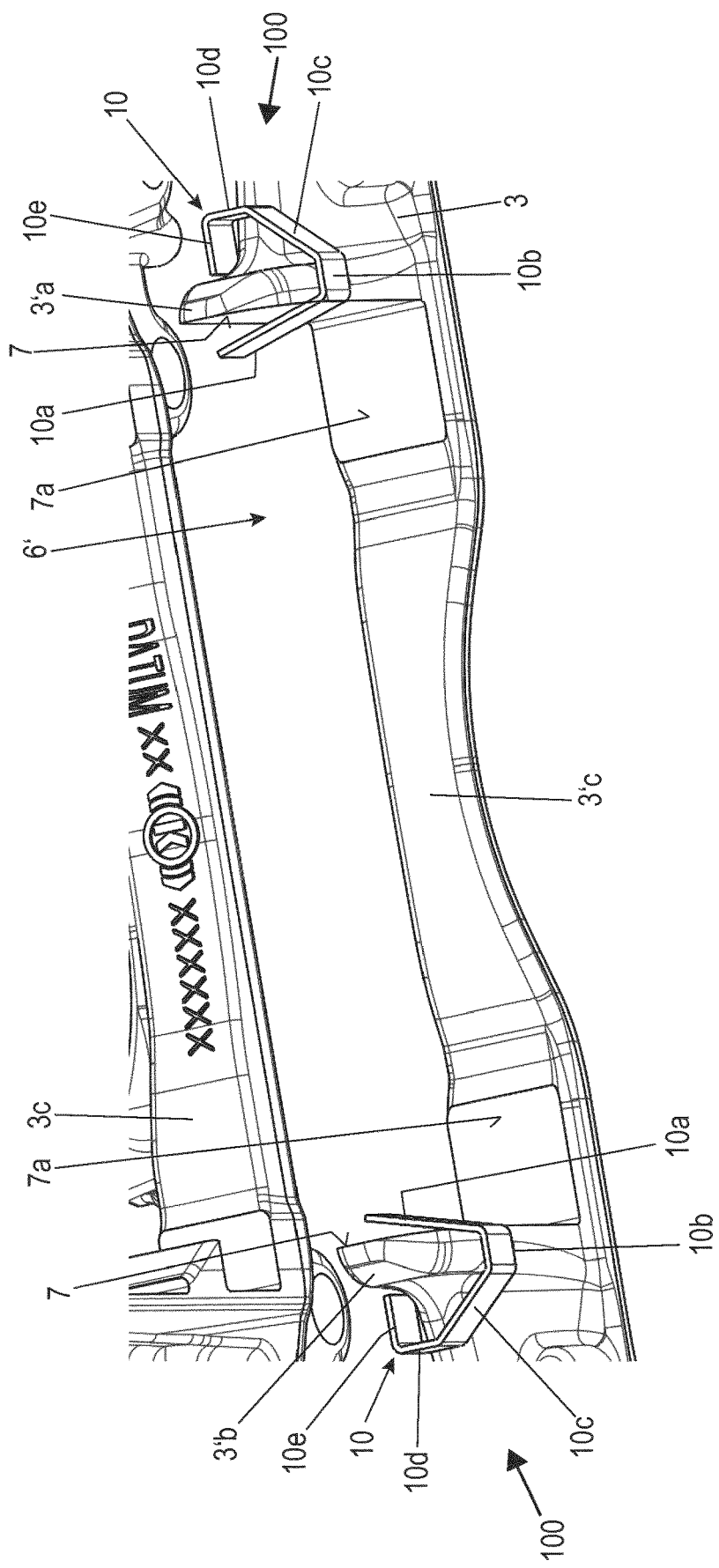

FIG. 1 shows a schematic perspective view of an exemplary embodiment of a disc brake 1 according to the invention with a pad resetting apparatus 100. Schematic perspective views of a brake carrier 3 of disc brake 1 according to FIG. 1 with pad resetting apparatus 100 are represented in FIGS. 2-3.

Disc brake 1 comprises a brake disc 2 with a brake disc rotational axis 2a, a brake carrier 3, a brake caliper 4, and two brake pads 5, 5' arranged on both sides of brake disc 2.

Brake carrier 3 is fitted in a stationary manner on a vehicle to which disc brake 1 is assigned. Brake carrier 3 forms a holder for brake caliper 4 and brake pads 5, 5'.

Brake caliper 4 engages around brake disc 2 and is fitted as what is known as a sliding caliper relative to brake disc 2 axially in the direction of disc brake rotational axis 2a displaceably on brake carrier 3. To this end, brake caliper 4 with bearing portions on guide rails which are connected to brake carrier 3 is mounted axially displaceably on brake carrier 3.

Brake caliper 4 comprises an application portion 4a, a rear portion 4b and two tie bars 4c. Application portion 4a runs with one side parallel to the plane of brake disc 2 on one side of brake disc 2. Rear portion 4b which is connected to application portion 4a at in each case one end via in each case a tie bar 4c is arranged on the other side of brake disc 2, also running parallel to brake disc 2. Tie bars 4c run substantially at a right angle to application portion 4a and to rear portion 4b. Application portion 4a has an inner space in which an application apparatus, not shown, of disc brake 1 is arranged.

In each case one brake pad 5, 5' is arranged on both sides of brake disc 2. Brake pad 5 arranged between brake disc 2 and application portion 4a of brake caliper 4 is referred to as the action-side or also application-side brake pad. Other brake pad 6' is arranged between brake disc 2 and rear portion 4b and is referred to as the rear-side or also reaction-side brake pad 5' and is differentiated from application-side brake pad 5 by reference number 5'. Reference numbers of the components and functional groups which are located on the side of brake disc 2 which points toward rear portion 4b of brake caliper 4 are marked with an apostrophe.

A pad resetting apparatus 100 with which the at least one brake pad 5, 5' can be returned after a braking-induced displacement and release of the brake is assigned to at least one of brake pads 5, 5'. Each brake pad 5, 5' can thus also be equipped with a pad resetting apparatus 100, wherein disc brake 1 can then have two pad resetting apparatuses 100.

Pad resetting apparatus 100 comprises at least one resilient structural element which is arranged between a brake pad 5, 5' and a stationary component of disc brake 1. These resilient structural elements are covered in the exemplary embodiment in FIG. 1 by the surrounding components and are best apparent in FIGS. 2 and 3. FIG. 1 primarily serves as an overview and arrangement of the components of disc brake 1.

FIG. 2 shows a schematic perspective view of brake carrier 3 of disc brake 1 according to FIG. 1 with rear-side brake pad 5' and pad resetting apparatus 100. The other side of brake carrier 3 which points toward application portion 4a of brake caliper 4 is referred to as the fastening side and is fastened to a stationary part of an assigned vehicle. Brake carrier 3 according to FIG. 2 with pad resetting apparatus 100 without brake pad 5' is represented in FIG. 3.

Each brake pad 5, 5' has a pad carrier plate 5a, 5'a and a friction lining 5b, 5'b fastened thereon on the side facing brake disc 2, which is referred to as pad side 5c, 5'c, which friction lining 5b, 5'b is pressed against brake disc 2 when functioning, i.e. during braking. The other side of pad carrier plate 5a, 5'a is referred to in the case of application-side brake pad 5 as pressure side 5d, wherein, in the case of rear-side brake pad 5', it is referred to as rear side 16. Application-side brake pad 5 is thus operatively connected with its rear side 5d to the application apparatus of disc brake 1, wherein rear side 16 of rear-side brake pad 5' is in contact with the inside of rear portion 4b of brake caliper 4.

Pad carrier plates 5a, 5'a of brake pads 5, 5' have in each case two side surfaces 8 and bearing surfaces 7b on their undersides.

Brake carrier 3 has two pad channels 6, 6'. Each pad channel is fixed laterally by brake carrier horns 3a, 3b; 3'a, 3'b and on the underside in each case by a bridge connector 3c, 3'c. Bridge connectors 3c, 3'c connect in each case respective two brake carrier horns 3a, 3b; 3'a, 3'b in their lower regions.

In each case one brake pad 5, 5' is arranged in each pad channel 6, 6'. In this case, each brake pad 5, 5' bears with its respective side surfaces 8 against inner surfaces 7 of brake carrier horns 3a, 3b; 3'a, 3'b, wherein each brake pad 5, 5' lies with its bearing surfaces 7b on respective bearing surfaces 7a of a respective base of respective pad channel 6, 6' of brake carrier 3. The base of respective pad channel 6, 6' is formed in each case by bridge connector 3c, 3'c of brake carrier 3.

Brake pads 5, 5' are arranged displaceably in the y-direction in pad channels 6, 6' parallel to brake disc rotational axis 2a guided on bearing surfaces 7a between inner surfaces 7 of brake carrier horns 3a, 3b; 3'a, 3'b.

A pad holding bracket BE (FIG. 1) is arranged above brake pads 5, 5' running parallel to the brake disc rotational axis in the y-direction application portion 4a and rear portion 4b of brake caliper 4. Pad holding bracket BE presses here with portions of its underside on pad holding springs 9, 9' of both brake pads 5, 5', as a result of which brake pads 5, 5' are held in their pad channels 6, 6'.

Brake pads 5, 5' can, in the case of braking, be pressed on both sides onto brake disc 2, wherein they are displaced in the y-direction. Brake pads 5, 5' can, for a change, be removed from their associated pad channels 6, 6' in the z-direction and inserted therein again.

Braking is performed by means of the application apparatus arranged in application portion 4a of brake caliper 4 there in a receiving space, e.g. with a brake lever. Application-side brake pad 5 initially contacts brake disc 2 during braking. Brake caliper 4 is subsequently displaced in the opposite direction by means of occurring reaction forces, while entraining rear-side brake pad 5', until it also comes to bear against brake disc 2 in a frictional manner.

After a release of the brake, both opposing brake pads 5, 5' are released by means of pad resetting apparatus 100 so far from brake disc 2 that it runs freely with respect to brake pads 5, 5'.

In this manner, residual grinding of respective brake pad 5, 5' on brake disc 2 can be ruled out or at least significantly reduced by the return of brake pads 5, 5' from brake disc 2 by means of pad resetting apparatus 100. A service life of frictional partners brake pads 5, 5' and brake disc 2 is thus increased and fuel consumption is reduced.

In this case, pad resetting apparatus 100 exerts a force, which is referred to below as a resetting force, on each brake pad 5, 5'. This resetting force moves the respective brake pad 5, 5' and brake caliper 4 over rear-side brake pad 5 in the direction of brake disc rotational axis 2a away from brake disc 2. In other words, application-side brake pad 3 is displaced from brake disc 2 in the opposite direction of an application force of the application apparatus onto application portion 4a of brake caliper 4, wherein rear-side brake pad 5' is displaced from brake disc 2 in a direction of movement opposite to application-side brake pad 5 together with brake caliper 4 in the y-direction.

The resetting force of pad resetting apparatus 100 is generated by one or more resetting elements 10, 13, 18, 19, 21 which are fitted in a pretensioned manner between respective brake pad 5, 5' and a stationary reference. The term stationary reference refers to components of disc brake 1 which are connected in a stationary manner to the vehicle to be assigned, such as, for example, brake carrier 3.

The resetting force can be applied onto respective brake pad 5, 5' as a tensile or/and compressive force.

In order to apply the resetting force onto respective brake pad 5, 5', pad resetting apparatus 100 engages on respective brake pad 5, 5', for example, centrally on an edge region (side edge or/and lower edge) of pad carrier plate 5a, 5'a or symmetrically on two lateral bearing regions right and left. The bearing region can also lie at the bottom directly on respective corner portions of pad carrier plates 5a, 5a. It is naturally also possible that engagement points or regions on respective pad carrier plate 5a, 5'a can also be arranged as desired, e.g. centrally between a respective side and a central point.

In the exemplary embodiment shown in FIGS. 2 and 3, the energy accumulator elements of pad resetting apparatus 100 are formed as resetting elements 10 and engage in each case in a central region of a respective side edge of pad carrier plate 5a, 5'a of a brake pad 5, 5'.

Pad resetting apparatus 100 comprises in this exemplary embodiment two resetting elements 10 for each pad channel 6, 6'. Here, in each case a resetting element 10 is fastened to in each case a brake carrier horn 3a, 3b; 3'a, 3'b. In each case rear-side pad channel 6' is represented in FIGS. 2 and 3. The following explanations for said rear-side pad channel 6' also apply to application-side pad channel 6.

Resetting elements 10 have an identical structure. Resetting element 10 on the left in FIGS. 2 and 3 is thus described as representative of all resetting elements 10.

Resetting element 10 comprises a spring arm 10a and four holding portions 10b, 10c, 10d, 10e. Spring arm 10a has a free end and is connected with the other end to first holding portion 10b. An angle between spring arm 10a and first holding portion 10b is larger than 90°, for example, 110° to 130°. The other end of first holding portion 10b is connected to second holding portion 10c which projects on the same side as spring arm 10a from first holding portion 10b and encloses with it an angle of approximately 135° to 155°. Here, second holding portion 10c is inclined away from spring arm 10a. Second holding portion 10c forms a transition into third holding portion 10d, wherein third holding portion 10d runs with respect to first holding portion 10b at an angle of approximately 90°. Finally, third holding portion 10d forms a transition into fourth holding portion 10e which is fitted thereon at approximately a right angle and which runs toward spring arm 10a.

A length of spring arm 10a corresponds approximately to a length of inner surface 7 of brake carrier horn 3a, 3b; 3'a, 3'b in the y-direction, i.e. in the direction of brake disc rotational axis 2a. A length of first holding portion 10b corresponds approximately to a quarter of the length of spring arm 10a or a length of a central outer portion of brake carrier horn 3a, 3b; 3'a, 3'b in the y-direction in a central region. Angled second holding portion 10c has approximately two-thirds of the length of spring arm 10a, wherein the lengths of third and fourth holding portion 10d, 10e are of approximately the same size. Since resetting element 10 is pushed-on and fastened on brake carrier horn 3a, 3b; 3'a, 3'b, e.g. by jamming, the lengths indicated above can vary as a function of the outer contour of brake carrier horn 3a, 3b; 3'a, 3'b.

Resetting element 10 is produced here as a one-piece punched bent part, e.g. from flat spring steel with a rectangular cross-section.

In the mounted state, holding portions 10b, 10c, 10d, 10e engage around the outer contour of brake carrier horn 3a, 3b; 3'a, 3'b in the form of a clamp. First holding portion 10b is arranged on the outside of brake carrier horn 3a, 3b; 3'a, 3'b and points either toward rear portion 4b or application portion 4a of brake caliper 4. Fourth holding portion 10e is arranged approximately parallel to first holding portion 10b on the side of brake carrier horn 3a, 3b; 3'a, 3'b which points toward brake disc 2. Spring arm 10a projects obliquely from inner surface 7 of brake carrier horn 3a, 3b; 3'a, 3'b resiliently into pad channel 6, 6', wherein the free end of spring arm 10a points toward brake disc 2.

If associated brake pad 5, 5' is inserted into respective pad channel 6, 6', its side surfaces 8 push respective spring arm 10a counter to its spring force in the direction of respective inner surface 7 of respective associated brake carrier horn 3a, 3b; 3'a, 3'b, wherein respective spring arm 10a is tensioned. In the case of a braking process, brake pads 5, 5' are pushed further in the y-direction against brake disc 2, wherein spring arms 10a are then pressed from side surfaces 8 of brake pads 5, 5' until bearing against inner surfaces 7 of brake carrier horns 3a, 3b; 3'a, 3'b and are tensioned further.

When releasing the brake, brake pads 5, 5' are then reset by previously tensioned spring arms 10a of pad resetting apparatus 100 into their starting positions. This is brought about by a force component of the spring force of spring arms 10a which acts in the Y-direction pointing away from brake disc 2. Spring arms 10a are in contact with pad carrier plate 5a, 5'a of respective brake pad 5, 5' in such a manner that they engage in a central region of the sides on the edge of side surfaces 8. In other words, for each pad channel 6, 6', resetting elements 10 grip on both sides of shaft 6, 6' via brake carrier horns 3a, 3b; 3'a, 3'b and bring about, by means of respective angled spring arm 10a, the resetting action on respective brake pad 5, 5'.

Resetting elements 10 exert with their spring arms 10a compressive forces for resetting brake pad 5, 5' on this.

It is also conceivable that spring elements 10 are configured with more than one spring arm 10a.

Brake carrier horns 3a, 3b; 3'a, 3'b can be correspondingly machined for improved bearing of holding portions 10b, 10c, 10d, 10e. Inner surface 7 can also have a groove 7c which corresponds to spring arm 10a, in which groove 7c spring arm 10a is received in the tensioned state with inserted brake pad 5, 5' and applied brake.

In this example, pad resetting apparatus 100 is fitted on brake carrier 3. Brake pads 5, 5' are unchanged in this embodiment.

Figure 4:
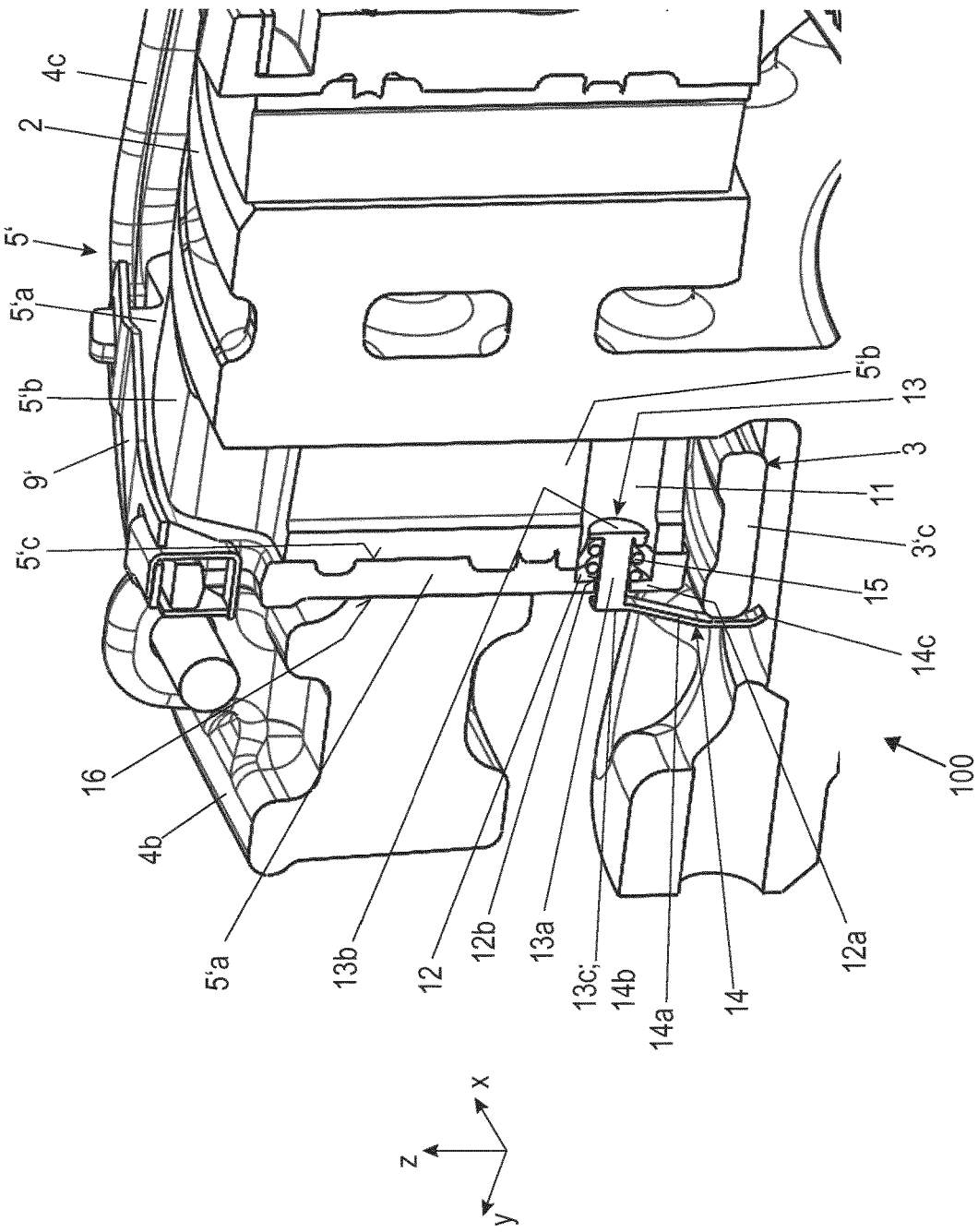
Figure 5:
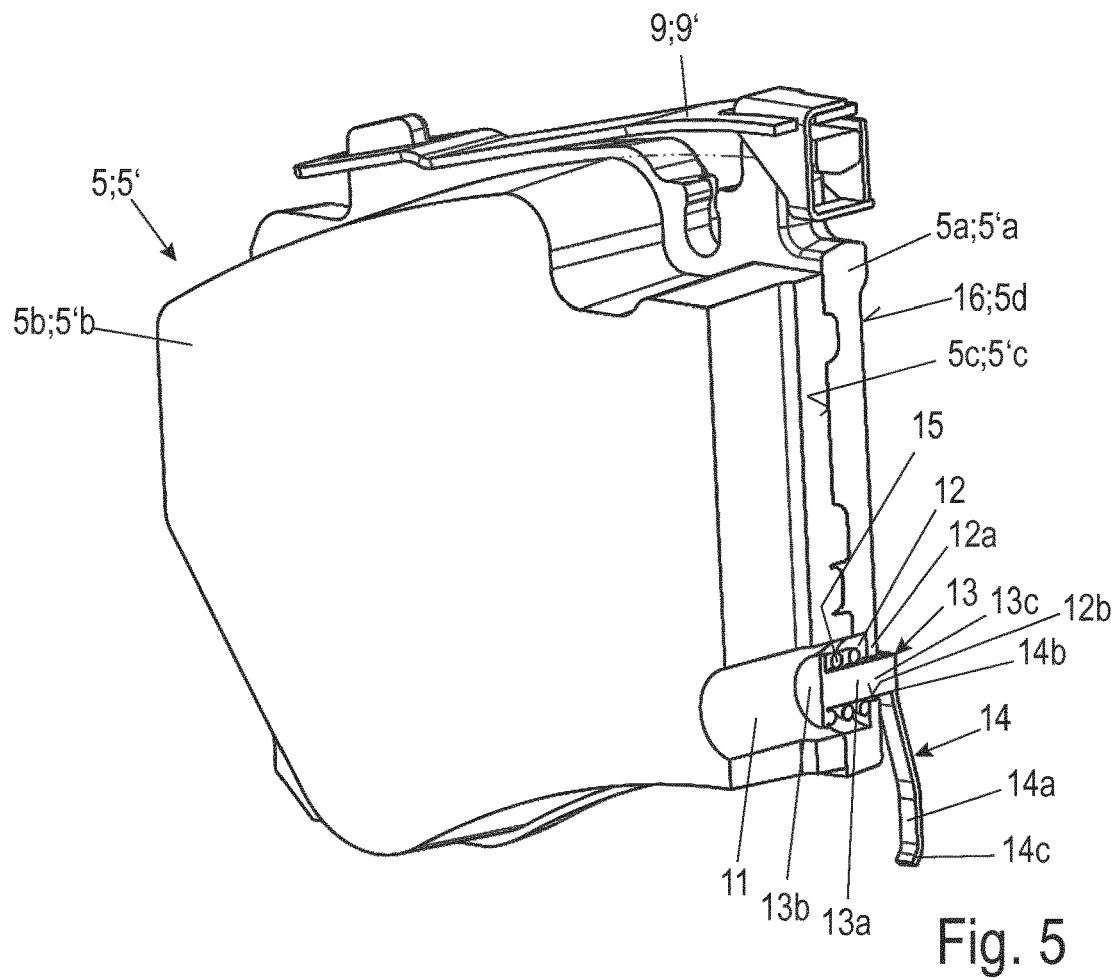
Figure 6:
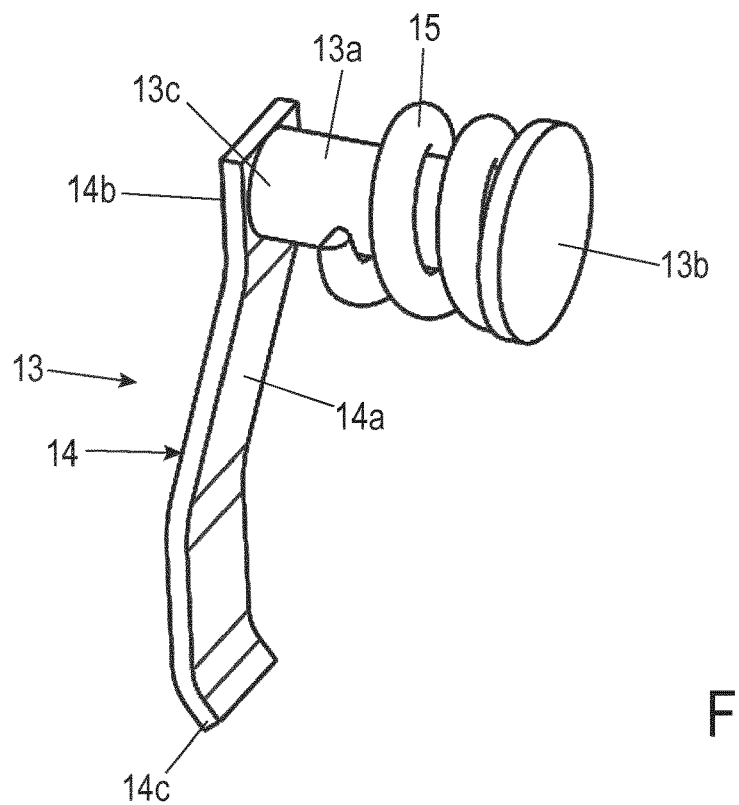
FIG. 6 shows a schematic perspective view of a resetting element of the variant of the pad resetting apparatus according to FIGS. 4-5.

Schematic perspective partial views of a first variant of pad resetting apparatus 100 of disc brake 1 according to FIG. 1 is shown in FIGS. 4 and 5. FIG. 6 represents a schematic perspective view of a resetting element 13 of the variant of pad resetting apparatus 100 according to FIGS. 4 and 5.

In the first variant of pad resetting apparatus 100, brake pads 5, 5' are provided with resetting elements 13, wherein brake carrier 3 can remain unchanged. Pad resetting apparatus 100 thus has here a resetting element 13 for each brake pad 5, 5'. FIG. 4 shows rear-side brake pad 5' with rear portion 4b and a tie bar 4c of brake caliper 4 and rear-side longitudinal connector 3'c of brake carrier 3 in a sectional plane which lies in brake disc rotational axis 2a and runs along it. FIG. 5 shows a brake pad 5, 5' generally in a perspective view with a section through the central plane as in FIG. 4.

Resetting element 13 is arranged installed centrally in a lower region of brake pad 5, 5' in a central plane which also runs through brake disc rotational axis 2a. A first part of resetting element 13 is arranged in a recess 11, 12 of brake pad 5, 5'. A second part of resetting element 13 is located on rear side 16 of pad carrier plate 5a, 5a and is in contact with stationary longitudinal connector 3c, 3'c of brake carrier 3. This is also described in detail below.

Recesses 11, 12 are provided here with a circular cross-section and communicate with one another, wherein they are arranged coaxially behind one another in the y-direction. Proceeding from the friction side (i.e. the contact side of friction lining 5b, 5'b which is brought into contact with brake disc 2 during braking) of friction lining 5b, 5'b of brake pad 5, 5', first recess 11 extends through friction lining 5b, 5'b and then forms a transition into second recess 12 in pad carrier plate 5a, 5'a. Second recess 12 extends approximately over three-quarters of pad carrier plate 5a, 5'a from pad side 5c, 5'c up to a wall portion 12a of pad carrier plate 5a, 5'a and then forms a transition into a through-hole 12b with a smaller diameter. Through-hole 12b extends through wall portion 12a of pad carrier plate 5a, 5'a up to its rear side 16, 5d.

Resetting element 13 comprises a cylinder pin 13a, a supporting arm 14 and an energy accumulator element 15.

Cylinder pin 13a of resetting element 13 is here a bolt with a circular cross-section and has at one end a head 13b, the diameter of which is larger than the diameter of cylinder pin 13a. The other end of cylinder pin 13a is referred to as an end portion 13c and is connected to supporting arm 14. Energy accumulator element 15, here in the configuration of a pressure spring, is pushed-on on cylinder pin 13a and arranged circumferentially around it between head 13b and supporting arm 14, wherein it extends approximately over two-thirds of the length of cylinder pin 13a and is supported with one end on head 13b of cylinder pin 13a. The other end of energy accumulator element 15 lies within second recess 12 on the inside of wall portion 12a of pad carrier plate 5a, 5'a if resetting element 13 is installed.

In the installed state, the first part of resetting element 13, which comprises here approximately two-thirds of the length of cylinder pin 13a, head 13b and energy accumulator element 15, as already mentioned above, is arranged in recesses 11, 12. The other third of cylinder pin 13 extends through through-hole 12b, wherein end portion 13c of cylinder pin 13a projects from rear side 16, 5d and is connected to supporting arm 14. Cylinder pin 13a is guided displaceably in through-hole 12b in its longitudinal direction which runs parallel to brake disc rotational axis 2a.

Supporting arm 14 is composed of a flat metal material, e.g. spring steel, here with a rectangular cross-section, with a body 14a, a connecting end 14b and an end portion 14c. Body 14a is fixedly connected with connecting end 14b, which is square here, to end portion 13c of cylinder pin 13a. This connection is performed after insertion of cylinder pin 13a and energy accumulator element 15 into recesses 11, 12, wherein end portion 13c projects out of through-hole 12b and is then connected to connecting end 14b of supporting arm 14, e.g. by welding, riveting or the like.

Body 14a of supporting arm 14 extends, in the installed state of resetting element 13, in the z-direction to brake disc rotational axis 2a via longitudinal connector 3c, 3'c of brake carrier 3 and is adapted in its form to the outer contour of longitudinal connector 3c, 3'c of brake carrier 3. Body 14a here is cranked pointing away from brake disc 2. A free end of body 14a is bent as end portion 14c toward brake disc 2 and bent around a lower edge of longitudinal connector 3c, 3'c of brake carrier 3.

Supporting arm 14 forms in this manner a support of cylinder pin 13a of resetting element 13 in the y-direction parallel to brake disc rotational axis 2a in each case in the direction of brake disc 2. Resetting element 13 of brake pad 5, 5' is thus arranged in a stationary manner.

The force for resetting brake pad 5, 5' and brake caliper 4 is ensured by means of energy accumulator element 15. When applying the brake, brake pad 5, 5' is pushed against brake disc 2 and counter to the force of energy accumulator element 15 of resetting element 13, wherein energy accumulator element 15 is tensioned. This is enabled in that energy accumulator element 15 which lies on wall portion 12a of pad carrier plate 5a, 5'a is compressed against head 13b of cylinder pin 13a which is stationary via supporting arm 14. Energy accumulator element 15 can also be installed in a pretensioned manner.

When releasing the brake, the energy stored in tensioned energy accumulator element 15 then acts in the direction of brake disc axis 2a in the y-direction such that brake pad 5, 5' is reset again into its starting position. Here, the stored force acts as a compressive force on brake pad 5, 5' via wall portion 12a of pad carrier plate 5a, 5'a, wherein energy accumulator element 15 is supported on head 13b of cylinder pin 13a held in a stationary manner by means of supporting arm 14.

In this example, only one resetting element 13 is provided. It is, however, also conceivable that two or more resetting elements 13 are arranged distributed over the lower edge of pad carrier plate 5a, 5'a.

Figure 7:
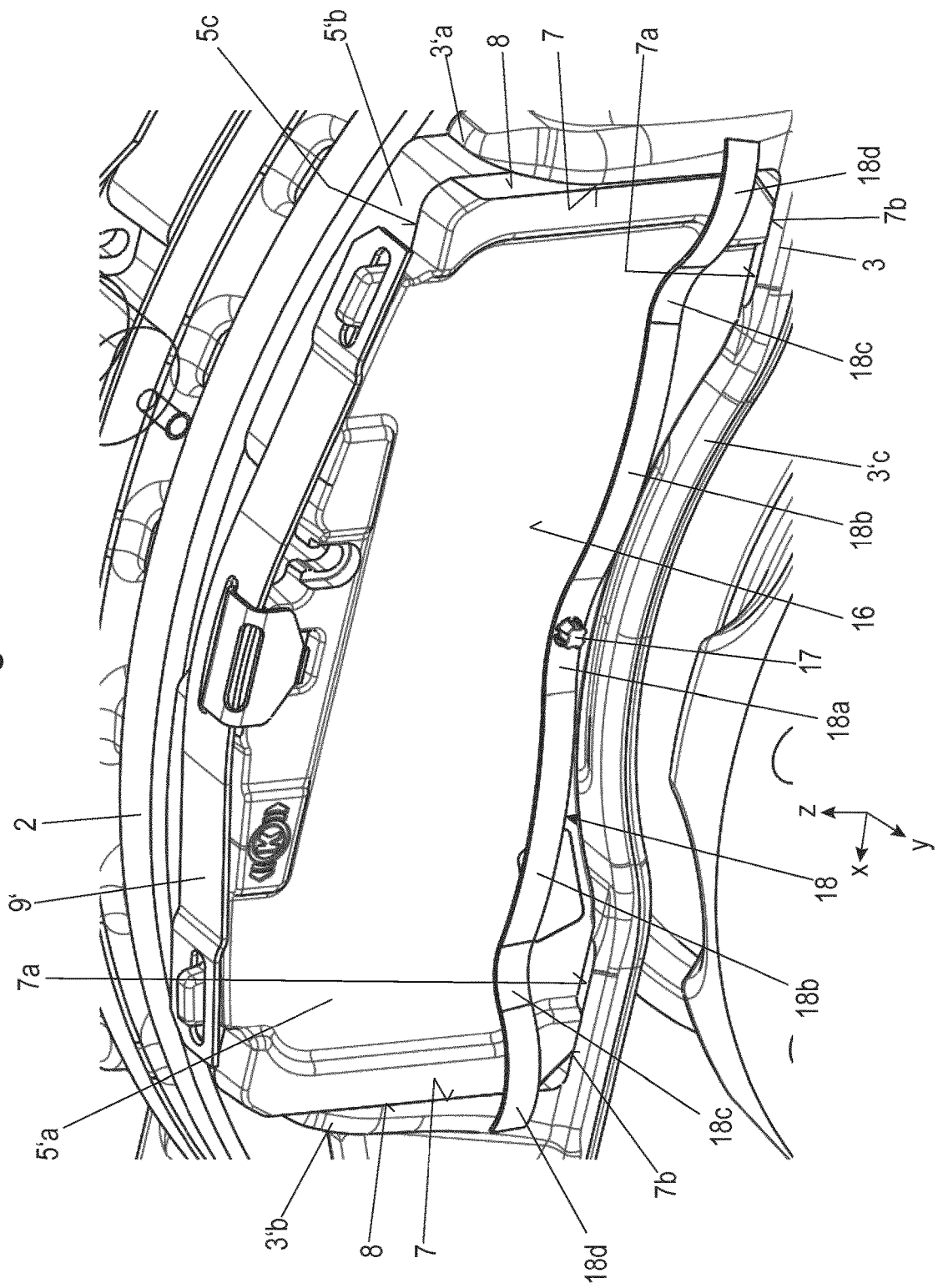
FIG. 7 shows a schematic perspective partial view of a second variant of the pad resetting apparatus of the disc brake according to FIG. 1.

FIG. 7 shows a schematic perspective partial view of a second variant of pad resetting apparatus 100 of disc brake 1 according to FIG. 1.

The second variant of pad resetting apparatus 100 has a resetting element 18 for each brake pad 5, 5' which is fastened to rear side 16, 5d of pad carrier plate 5a, 5'a of brake pad 5, 5'. FIG. 7 shows as an example of this a view of rear side 16 of pad carrier plate 5'a of rear-side brake pad 5' which is located in associated pad channel 6' of brake carrier 3 between brake carrier horns 3'a, 3'b. The description also applies in an analogous manner to application-side brake pad 5. Brake pad 5' bears with its side surfaces 8 against inner surfaces 7 of brake carrier horns 3'a, 3'b and stands with its bearing surfaces 7b on bearing surfaces 7a of brake carrier 3.

Resetting element 18 of pad resetting apparatus 100 is formed here as an elongate leaf spring element composed of spring steel with a rectangular cross-section and is fastened centrally in the lower region of pad carrier plate 5'a via a fastening element 17 to pad carrier plate 5'a on its rear side 16. Resetting element 18 extends symmetrically to an axis of symmetry which runs in the z-direction, i.e. radially to brake disc rotational axis 2a, centrally through fastening element 17, to the left and right, i.e. tangentially to brake disc 2, beyond the respective side edge of pad carrier plate 5'a to approximately beyond respective brake carrier horn 3'a, 3'b.

Resetting element 18 comprises in this second variant a central fastening portion 18a on which at each end in each case three spring portions 18b, 18c, 18d are fitted.

Fastening portion 18a is connected fixedly via fastening element 17 to pad carrier plate 5a, 5'a, e.g. in an interference fit. The ends of fastening portion 18a are bent away from rear side 16. These arcs form a transition in each case into the end of first spring portions 18b, wherein first spring portions 18b then arch to the outside, i.e. projecting further from the rear side, and then are bent with their ends back onto rear side 16. In each case a second, shorter spring portion 18c is fitted at these ends of first spring portions 18b, which spring portion 18c is arched to rear side 16, with its arc lying partially on rear side 16, then is bent with its end to the outside again and forms a transition into respective third spring portion 18d. Spring portions 18d are bent so that their arcs project from rear side 16 and their ends bear against respectively assigned brake carrier horn 3'a, 3'b at its outer contour. A stationary support of pad resetting apparatus 100 is thus realized with resetting element 18.

In one embodiment, which is not shown but is easily conceivable, two or more resetting elements 18 can be provided on top of one another in the z-direction. It is also conceivable that resetting element 18 has on each side two or more spring portions 18d.

When applying the brake, brake pad 5, 5' is pushed against brake disc 2 counter to the spring force of resetting element 18, wherein resetting element 18 is tensioned. It can also already be installed in a pretensioned manner. Resetting element 18 is configured so that it enables a lateral support with its third spring portions 18d on brake carrier horns 3'a, 3'b. As a result of this force, a resilient action is brought about between brake pads 5, 5' which can be moved in the y-direction and stationary brake carrier 3 and the resetting function of pad resetting apparatus 100 is realized by means of resetting elements 18.

When releasing the brake, the force stored in tensioned resetting element 18 then acts in such a manner in the direction of brake disc axis 2a in the y-direction via fastening portion 18a on brake pad 5, 5' that brake pad 5, 5' is once again reset from brake disc 2 into its starting position. In this case, compressive forces act by means of tensioned resetting element 18 for resetting of brake pad 5, 5'.

Machining of brake carrier horns 3a, 3b; 3'a, 3'b is not necessary. It is nevertheless conceivable that these can have a receptacle or bearing surface for contact with third spring portions 18d of resetting element 18.

Figure 8:
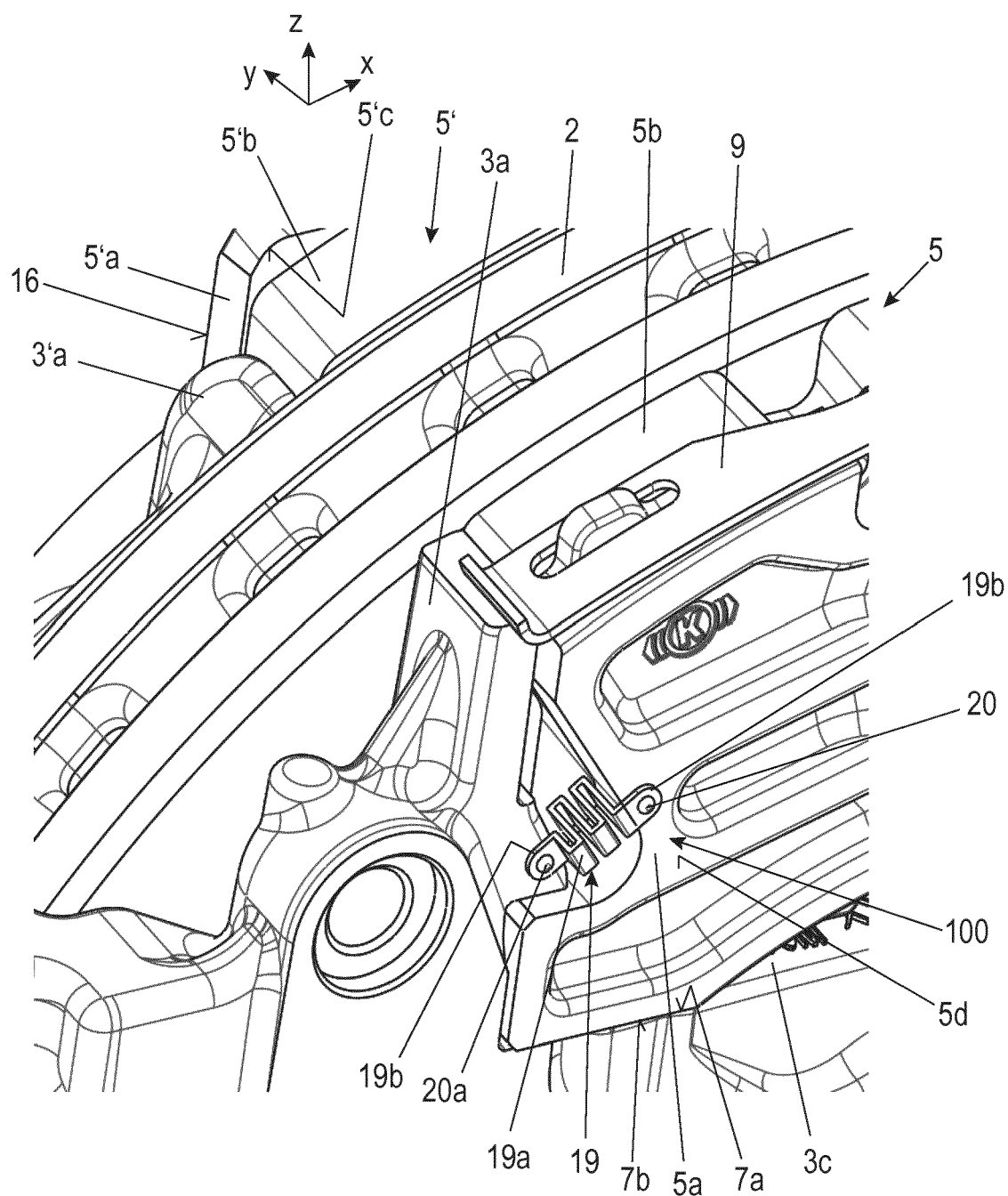
FIG. 8 shows a schematic perspective partial view of a third variant of the pad resetting apparatus of the disc brake according to FIG. 1.
Figure 9:
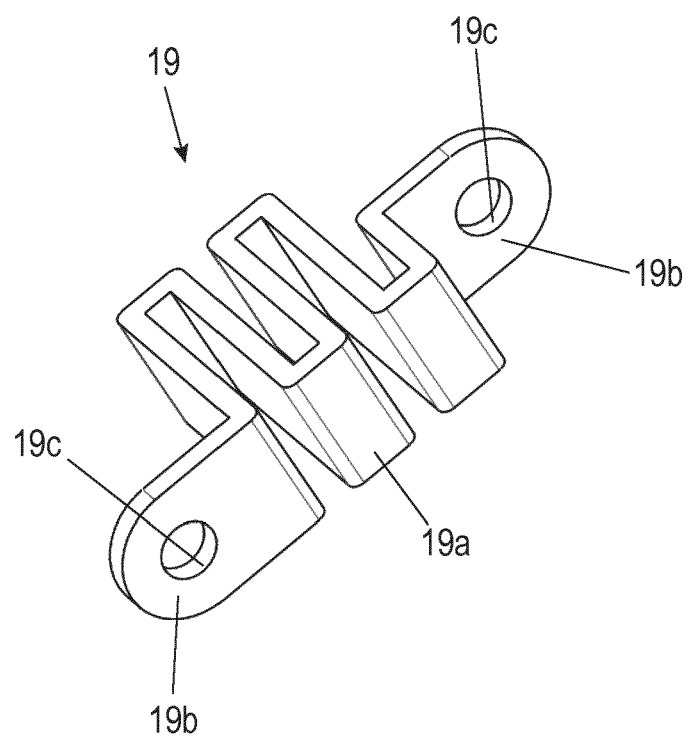
FIG. 9 shows a schematic perspective view of a resetting element of the third variant of the pad resetting apparatus according to FIG. 8.

A schematic perspective partial view of a third variant of pad resetting apparatus 100 of disc brake 1 according to FIG. 1 is represented in FIG. 8. FIG. 9 shows a schematic perspective view of a resetting element 19 of the third variant of pad resetting apparatus 100 according to FIG. 8.

Pad resetting apparatus 100 has, in the third variant, two resetting elements 19 for each brake pad 5, 5' which are fastened both to respective brake pad 5, 5' and to respectively associated brake carrier horns 3a, 3b; 3'a, 3'b.

FIG. 8 shows by way of example a part of application-side brake pad 5 with associated brake carrier horn 3a of pad channel 3. The description also applies in an analogous manner to rear-side brake pad 5'.

Resetting elements 19 are fastened on one hand to the sides of rear side 5d of pad carrier plate 5a approximately in a central region. On the other hand, resetting elements 19 are fitted on the outsides of brake carrier horns 3a, 3b. In the example shown in FIG. 8, resetting elements 19 are fixed in a foot region of brake carrier horns 3a, 3b to brake carrier 3, i.e. below the center in the z-direction.

A structure of resetting element 19 is represented in perspective in FIG. 9. Resetting element 19 has a spring portion 19a at the ends of which in each case a fastening portion 19b, here in the form of a tab with a fastening hole 19c, is fitted.

Spring portion 19a is composed here of a spring steel folded in a meandering manner of a flat material. The folds lie in planes which run at a right angle to planes of fastening portions 19b. The folded embodiment of spring portion 19a makes it possible to ensure a functionality of resetting element 19 over a longer spring path.

Fastening portions 19b enable a fastening of resetting element 19 with one end to pad rear plate 5a on its rear side 5d and with the other end to brake carrier horn 3a, 3b. Fastening is performed here, for example, by means of rivets or/and screws which extend in each case through fastening hole 19c and form a respective fastening point 20, 20a. It is naturally possible that fastening can also be performed in various forms, e.g. interference fit.

It is furthermore conceivable that not only one resetting element 19, but rather two or more can be provided for each side.

In the example shown in FIG. 8, an imaginary longitudinal axis of resetting element 19 runs through fastening holes 19c in an x-z plane. In the mounted state of resetting element 19, this is arranged so that the imaginary longitudinal axis is arranged obliquely by a certain angle in relation to the x-axis. Fastening point 20 of resetting element 19 bears against pad rear plate 5a of brake pad 5 in the positive z-direction above fastening point 20a of resetting element 19 on associated brake carrier horn 3a, 3b.

When applying the brake, brake pad 5, 5' is pushed against brake disc 2 and counter to the spring force, acting here as a compressive force, of resetting element 19, wherein resetting element 19 is tensioned. A tensile force occurs at both fastening points 20, 20a. Resetting element 19 can also be installed in an already pretensioned manner.

When releasing the brake, the force stored in tensioned resetting element 19 then acts in such a manner in the direction of brake disc axis 2a in the y-direction via one fastening portion 19b at fastening point 20 on brake pad 5, 5' and via other fastening portion 19b at fastening point 20a on stationary brake carrier horn 3a, 3b. Brake pad 5, 5' is then reset again from brake disc 2 into its starting position. In this case, the tractive forces act through tensioned resetting element 19 for resetting of brake pad 5, 5'.

Application-side brake pad 5 represented in FIG. 8 has on its sides in each case in the central region a nose-shaped recess, not designated, which extends in each case toward the center of brake pad 5. As a result of this, a lateral projection is formed on both sides of brake pad 5. Associated brake carrier horns 3a, 3b have in each case a nose which projects into pad channel 6 and which is received in the respective nose-shaped recess of brake pad 5. Here, brake pad 5 is pushed in the direction of brake disc rotational axis 2a parallel thereto into pad channel 6 axially, but not radially from above. Lateral projections of brake pad 5 are received in this manner in a respective recess of associated brake carrier horn 3a, 3b below the nose projecting into pad channel 6. In this manner, only a degree of freedom of an axial displacement parallel to brake disc rotational axis 2a is produced for this application-side brake pad 5, as a result of which this application-side brake pad 5 is held radially.

Figure 10:
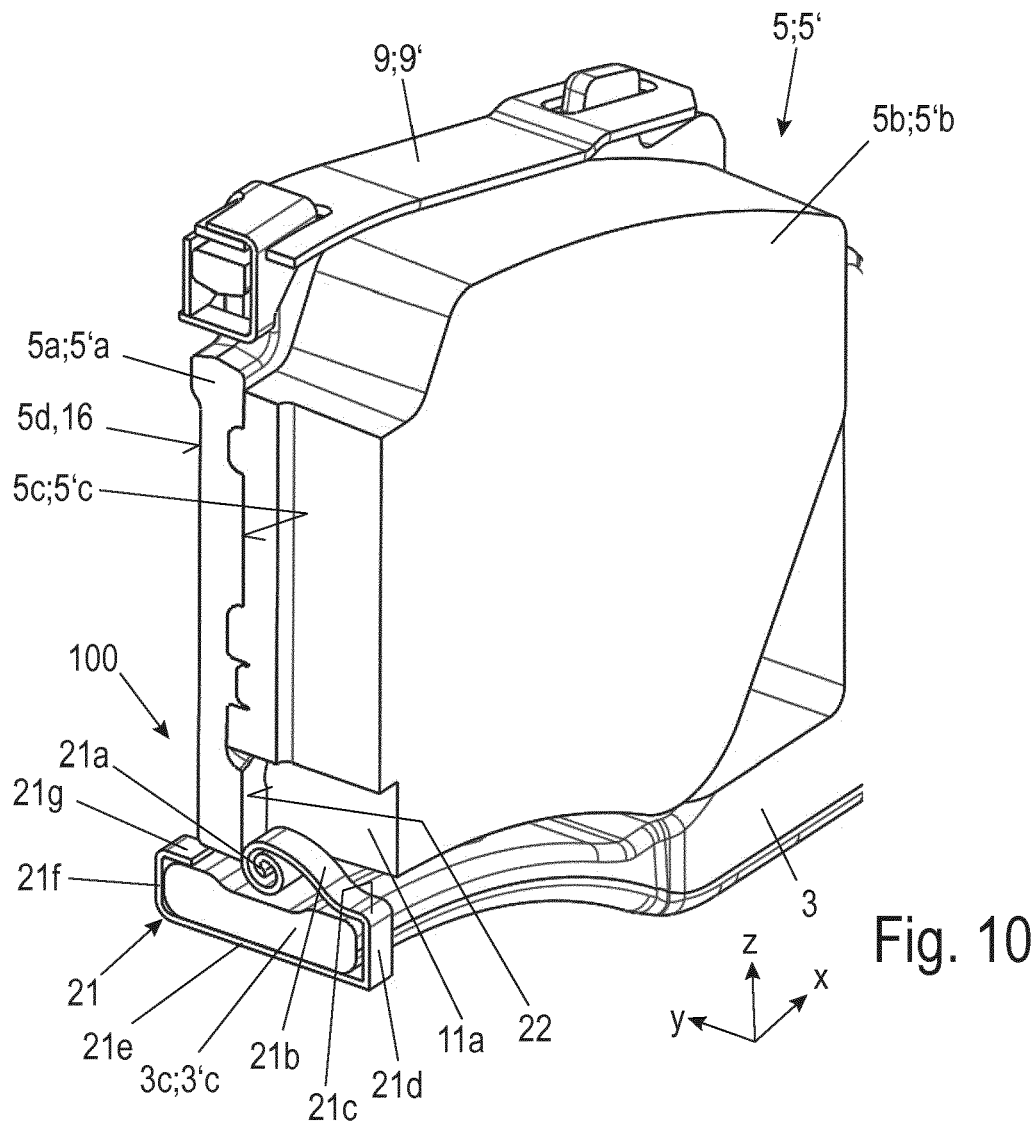
FIG. 10 shows a schematic perspective partial view of a fourth variant of the pad resetting apparatus of the disc brake according to FIG. 1.
Figure 11:
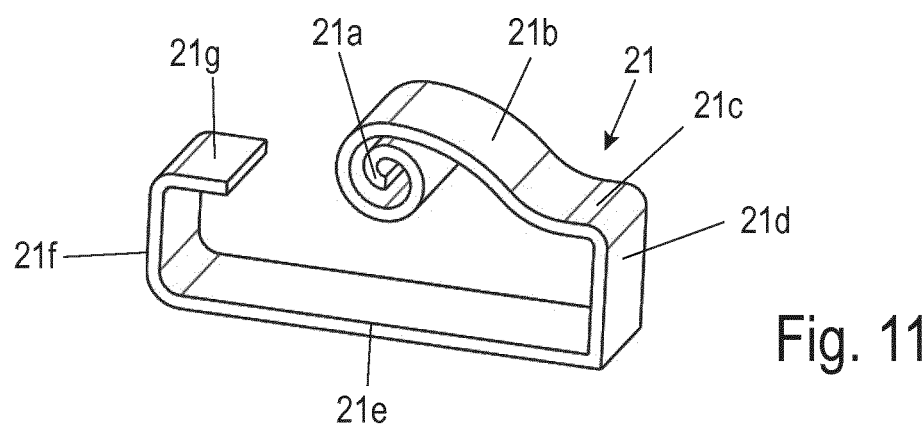
FIG. 11 shows a schematic perspective view of a resetting element of the fourth variant of the pad resetting apparatus according to FIG. 10.

FIG. 10 shows a schematic perspective partial view of a fourth variant of pad resetting apparatus 100 of disc brake 1 according to FIG. 1. A schematic perspective view of a resetting element 21 of the fourth variant of pad resetting apparatus 100 according to FIG. 10 is represented in FIG. 11.

Pad resetting apparatus 100 of the fourth variant comprises a resetting element 21 for each brake pad 5, 5' which is fitted in a stationary manner on associated longitudinal connector 3c, 3'c of brake carrier 3.

FIG. 10 shows by way of example a part of a brake pad 5, 5' with associated longitudinal connector 3c, 3'c of brake carrier 3. The description applies to application-side and rear-side brake pad 5'. FIG. 10 shows a section in an x-z plane in brake disc rotational axis 2a and thus through the center of brake pad 5, 5' and of longitudinal connector 3c, 3'c of brake carrier 3.

Resetting element 21 is arranged above longitudinal connector 3c, 3'c in its center and fastened to longitudinal connector 3c, 3'c by clamping action. It therefore forms a stationary attachment. Resetting element 21 is furthermore in contact with pad carrier plate 5a, 5'a of brake pad 5, 5' and brings about at this interface a resetting action on brake pad 5, 5' and brake caliper 4.

Resetting element 21 of the fourth variant comprises a pressure portion 21a, a spring portion 21b and five holding portions 21c, 21d, 21e, 21f, 21g.

Pressure portion 21a is composed here of a winding which is fitted via spring portion 21b at one end of first holding portion 21c. The start of the winding forms a free end which lies in the center of the winding. The other end of the winding has an arc with a radius which is significantly larger than the winding radius. This arc forms spring portion 21b, is bent downward and forms a transition into short first holding portion 21c bent in the opposite direction. Second holding portion 21d which is bent downward at a right angle and which has approximately the same length as first holding portion 21c is fitted on first holding portion 21c. Lower end of second holding portion 21d is connected to an end of third holding portion 21e which runs at a right angle to second holding portion 21d and parallel to first holding portion 21c. A length of third holding portion 21e corresponds here approximately to four times the length of second holding portion 21d. The other end of third holding portion 21e forms a transition into fourth holding portion 21f fitted there in a rounding. Fourth holding portion 21f runs at a right angle upward to third holding portion 21e. A length of fourth holding portion 21f corresponds to a length of second holding portion 21e with respect to which fourth holding portion 21f also runs parallel. The upper end of fourth holding portion 21f is adjoined by fifth holding portion 21g which runs at a right angle to fourth holding portion 21f, has approximately half the length of second holding portion 21c or fourth holding portion 21f and is parallel to third holding portion 21e.

In other words, holding portions 21c, 21d, 21e, 21f, 21g form a C shape. Here, spring portion 21b is formed with pressure portion 21a on one of the short limbs of the C-shape via first holding portion 21c. A center of pressure portion 21a lies approximately opposite the center of the long limb of the C-shape which third holding portion 21e forms.

The relative length indications for holding portions 21c, 21d, 21e, 21f, 21g should only be seen by way of example and correspond to the outer contour of respective longitudinal connector 3c, 3'c on which resetting element 21 is fitted.

Resetting element 21 is here a flat spring steel with a rectangular cross-section and is formed in one piece as a punched bent part, wherein pressure portion 21a is embodied in a rolled manner.

In the installed state, resetting element 21 is fitted with its holding portions 21c, 21d, 21e, 21f, 21g in a bracket-like manner around longitudinal connector 3c, 3'c of brake carrier 3 and fixed thereon by clamping action of holding portions 21c, 21d, 21e, 21f, 21g. Here, pressure portion 21a and spring portion 21b are arranged on the upper side of longitudinal connector 3c, 3'c and in a recess 11a of friction lining 5b, 5'b of brake pad 5, 5'. Pressure portion 21a is in contact with a contact surface 22 of pad side 5c, 5'c of pad carrier plate 5a, 5'a of brake pad 5, 5' in the lower region. Resetting element 21 can also be installed under pretensioning so that a pretensioning force of spring portion 21b of resetting element 21 pushes pressure portion 21a against contact surface 22 of pad carrier plate 5a, 5'a.

It is also conceivable in this variant that only one resetting element 21, but rather two or more are provided.

If the brake is applied, brake pad 5, 5' is pushed against brake disc 2 and counter to the spring force of resetting element 21, wherein spring portion 21b is tensioned by pressure portion 21a. Second holding portion 21d can also have a spring action. Resetting element 21 is fixed via holding portions 21e, 21f, 21g in the y-direction in a stationary manner on longitudinal connector 3c, 3'c of brake carrier 3.

When releasing the brake, the force of spring portion 21b (and of pressure portion 21a and of first and second holding portion 21c, 21d) stored in tensioned resetting element 21 then acts in such a manner in the direction of brake disc axis 2a in the y-direction via pressure portion 21a on contact surface 22 of pad carrier plate 5a, 5'a of brake pad 5, 5' so that brake pad 5, 5' is once again reset from brake disc 2 into its starting position. In this case, compressive forces act through tensioned resetting element 21 to reset brake pad 5, 5'.

Figure 12:
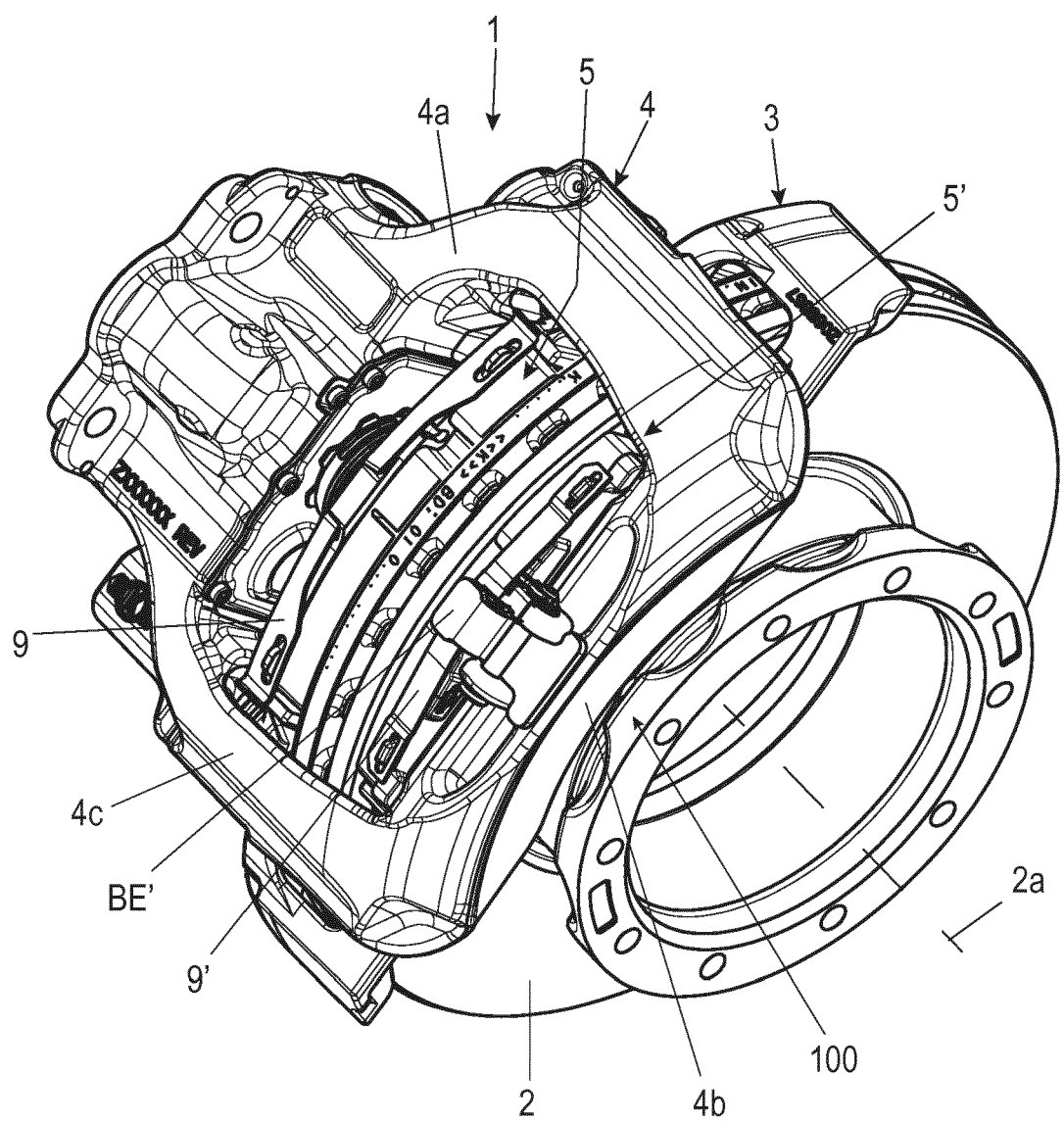
FIG. 12 shows a schematic perspective view of a further exemplary embodiment of the disc brake according to the invention with the pad resetting apparatus.

A schematic perspective view of a further exemplary embodiment of disc brake 1 according to the invention with pad resetting apparatus 100 is represented in FIG. 12.

Disc brake 1 of this further exemplary embodiment differs from disc brake 1 according to FIG. 1 in that application-side brake pad 5 according to application-side brake pad 5 shown in FIG. 8 is only formed with only a degree of freedom in the direction of brake disc rotational axis 2a.

In this case, disc brake 1 of the further exemplary embodiment according to FIG. 12 has a pad holding bracket BE' which is formed to be shortened in terms of its length in comparison with pad holding bracket BE of disc brake 1 of the exemplary embodiment according to FIG. 1. Pad holding bracket BE' therefore extends from its fastening to rear portion 4b of brake caliper 4 in the direction of brake disc rotational axis 2a only up to rear-side brake pad 5', as a result of which rear-side brake pad 5' is radially secured. Moreover, in this case, access to brake pads 5, 5' through the opening in brake caliper 4 between rear portion 4b and application portion 4a is facilitated.

The described exemplary embodiments of pad resetting apparatus 100 can be used both in the case of application-side brake pad 5 and in the case of rear-side brake pad 5'. It is possible here that both brake pads 5, 5' or also only one, either application-side brake pad 5 or rear-side brake pad 5', can be provided with a resetting apparatus 100.

The invention can be modified in the scope of the enclosed claims.

It is thus, for example, possible not only to apply one embodiment of resetting elements 10, 13, 18, 19, 21 described above, but also different variants to a disc brake 1.

LIST OF REFERENCE NUMBERS

1 Disc brake
2 Brake disc
2a Disc brake rotational axis
3 Brake carrier
3a, 3b; 3'a, 3'b Brake carrier horn
3c, 3'c Longitudinal connector
4 Brake caliper
4a Application portion
4b Rear portion
4c Tie bar
5, 5' Brake pad
5a, 5'a Pad carrier plate
5b, 5'b Friction lining
5c, 5'c Pad side
5d Rear side
6, 6' Pad channel
7 Inner surface
7a, 7b Bearing surface
7c Groove
8 Side surface
9, 9' Pad holding spring
10 Resetting element
10a Spring arm
10b, 10c, 10d, 10e Holding portion
11, 11a Recess
12 Recess
12a Wall portion
12b Through-hole
13 Resetting element
13a Cylinder pin
13b Head
13c End portion
14 Supporting arm
14a Connecting end
14b End portion
15 Energy accumulation element
16 Rear side
17 Fastening element
18 Resetting element
18a Fastening portion
18b, 18c, 18d Spring portion 19 Resetting element
19a Spring portion
19b Fastening portion
19c Fastening hole
20, 20a Fastening point
21 Resetting element
21a Pressure portion
21b Spring portion
21c, 21d, 21e, 21f Holding portion
22 Contact surface
100 Pad resetting apparatus
BE, BE' Pad holding bracket
x, y, z Coordinates

What is claimed is:

1. A disc brake for a utility vehicle, comprising:
a stationary brake carrier;
a brake caliper which engages over a brake disc having a rotation axis, is formed as a sliding caliper, and is fastened to the stationary brake carrier;
two brake pads which are arranged in the brake caliper, are moveable in opposite axial directions and have, in each case, a pad carrier plate having opposite sides spaced apart in a direction orthogonal to the rotation axis and opposite faces spaced apart in the axial direction, and a friction lining fastened to one of the opposite faces, wherein
one brake pad is an action-side or application-side brake pad pressable via an application apparatus by way of at least one brake piston against the brake disc, wherein
the brake pads are received, in each case, in a pad channel of the stationary brake carrier, the pad channel being defined by two opposing brake carrier horns comprising inner facing surfaces opposing each other and a longitudinal connector that connects the two opposing brake carrier horns; and
a pad resetting apparatus assigned to at least one of the two brake pads and comprising at least one holding portion fastened by enclosing an outer contour of at least one of the two opposing brake carrier horns and a spring arm connected to the at least one holding portion and projecting obliquely from the inner facing surface of the at least one brake carrier horn, wherein the spring arm engages one of the sides of the pad carrier plate, and wherein the assigned one brake pad is returnable via the spring arm applying an axial return compression force to the assigned one brake pad in the direction of the rotation axis after a braking-induced displacement and release of the disc brake.

2. The disc brake as claimed in claim 1, wherein
the pad resetting apparatus of the assigned one brake pad has two resetting elements, of which in each case one resetting element is fastened to each one of the two opposing brake carrier horns of a pad channel of the stationary brake carrier.

3. The disc brake as claimed in claim 2, wherein
the two resetting elements have two of the spring arms projecting obliquely from respective inner facing surfaces of the two opposing brake carrier horns.

4. The disc brake as claimed in claim 3, wherein
the two resetting elements are pushed-on and fastened with their respective holding portions on the respective brake carrier horns of the pad channel, wherein
the spring arms project in each case into the pad channel.

5. The disc brake as claimed in claim 4, wherein
the respective holding portions of the two resetting elements each form a clamp and are fitted on the respective brake carrier horn of the pad channel by pressing.

6. The disc brake as claimed in claim 5, wherein
the spring arms of the two resetting elements are in contact with the pad carrier plate of the associated brake pad which is arranged in the pad channel between the brake carrier horns such that the respective spring arms are in contact in a central region of an edge of side surfaces of the pad carrier plate as a result of action of the spring forces of the spring arms.

7. The disc brake of claim 1 wherein the holding portion comprises first, second, third and fourth holding portions, wherein the spring arm comprises a free end and an opposite end connected to a first end of the first holding portion, wherein a second end of the first holding portion opposite the first end is connected to a first end of a second holding portion, wherein a second end of the second holding portion opposite the first end of the second holding portion is connected to a first end of a third holding portion, and wherein a second end of the third holding portion opposite the first end of the third holding portion is connected to a first end of the fourth holding portion.

8. The disc brake of claim 7 wherein an angle between the spring arm and the first holding portion is greater than 90 degrees.

9. The disc brake of claim 8 wherein an angle between the first holding portion and the third holding portion is approximately 90 degrees.

10. The disc brake of claim 9 wherein an angle between the third holding portion and the fourth holding portion is approximately 90 degrees.

11. The disc brake of claim 8 wherein an angle between the first holding portion and the second holding portion is between and including 110 degrees and 130 degrees.

12. The disc brake of claim 7 wherein the spring arm and the second holding portion project from the same side of the first holding portion.

13. The disc brake of claim 1 wherein a length of the spring arm corresponds approximately to a length of the inner facing surface of the brake carrier horn extending in the axial direction.

14. A brake pad set for a disc brake, comprising:
first and second brake pads moveable toward and away from each other in an axial direction, each having a pad carrier plate comprising opposite sides spaced apart in a direction orthogonal to the axial direction and opposite faces spaced apart in the axial direction, and an associated friction lining arranged on one of the faces of the pad carrier plate;
a pad resetting apparatus for an assigned one of the first and second brake pads, wherein
the pad resetting apparatus of the assigned one brake pad has two resetting elements, of which in each case one resetting element is fastened to each one of opposing brake carrier horns of a pad channel of the stationary brake carrier, wherein the opposing brake carrier horns comprise inner facing surfaces opposing each other;
the two resetting elements each have a spring arm and holding portions, wherein
the respective spring arm is connected to one of the holding portions;
the two resetting elements are pushed-on and fastened with their respective holding portions by enclosing an outer contour of the respective brake carrier horn of the pad channel, wherein the spring arms project obliquely from the inner facing surfaces of the brake carrier horns into the pad channel;

the respective holding portions of the two resetting elements form a clamp and are fitted on the respective brake carrier horn of the pad channel by pressing; and the spring arms of the resetting elements are in contact with the opposite sides of the pad carrier plate of the associated brake pad which is arranged in the pad channel between the brake carrier horns such that each of the respective spring arms is in contact in a central region of an edge of a side surface of the pad carrier plate as a result of action of a spring force of the spring arm, wherein the respective spring arm applies an axial return compression force to the pad carrier plate of the associated brake pad so as to move the associated brake pad in the axial direction.

\* \* \* \* \*